June 21, 1949.　　　S. GUARNASCHELLI　　　2,473,879
FLEXIBLE METAL HOSE CONNECTION
Filed March 11, 1947
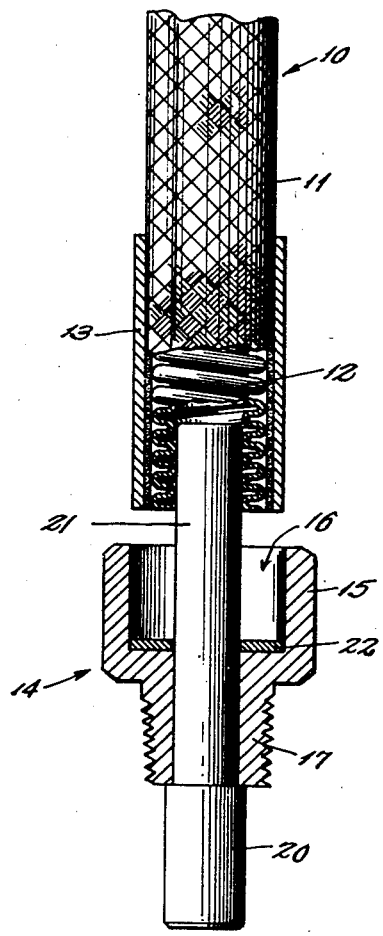
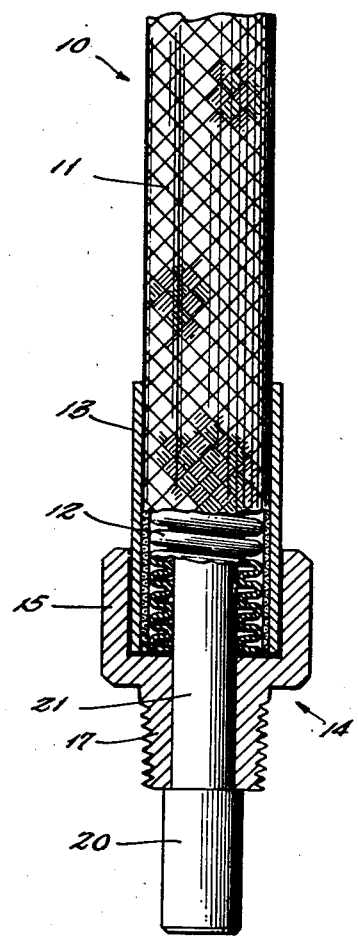
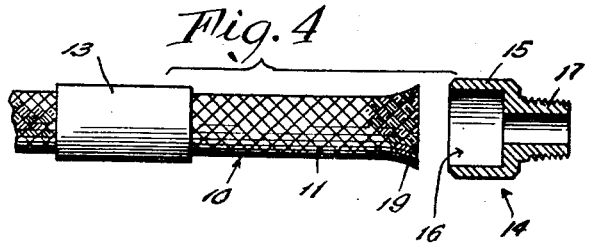
INVENTOR.
Stephen Guarnaschelli
BY
Johnson, Kline and Hensel
ATTORNEYS Patented June 21, 1949

2,473,879

UNITED STATES PATENT OFFICE 2,473,879

FLEXIBLE METAL HOSE CONNECTION

Stephen Guarnaschelli, Naugatuck, Conn., assignor to The Brockway Company, Naugatuck, Conn., a corporation of Connecticut Application March 11, 1947, Serial No. 733,842

2 Claims. (Cl. 285—74)

This invention relates to an improved method of securing standard flexible metal hose to a metal fitting or connector, and to the assembly thereby obtained.

Flexible metal hose as ordinarily employed in commerce comprises metal tubing of copper, brass, bronze or the like, having concentric or helical convolutions therein which render it readily flexible in axial planes, and provided with a cover or sheath of braided metal wire to protect the hose from injury upon contact with other objects, to prevent foreign matter from becoming lodge between the convolutions, and to improve its appearance.

The attachment of fittings or connections to the end of the aforesaid flexible metal hose has been accomplished heretofore by soldering. The fitting usually has a cup-shaped cavity for receiving the end of the hose, and solder is deposited therein to form a bond between the fitting and the hose when the latter is inserted in the cavity.

Certain difficulties attend the operations involved in soldering such a fitting to the end of a flexible metal hose in the aforesaid manner. Thus, when the hose is cut off, the wire braid of the sheath tends to expand at the severed end, rendering the hose exceedingly difficult to insert in the cavity of a fitting. In some cases, the braid is pushed back during insertion of the fitting so that no bond is formed between the fitting and the braid. In use, the braid then pulls out of the fitting, resulting in an unsightly and impractical connection. It is therefore necessary to squeeze and hold the braid together prior to such insertion, presenting considerable inconvenience and causing loss of time in the manipulation.

Often it is necessary to heat the fitting after assembly with the hose in order to melt the solder or to maintain it in molten condition long enough to form an adequate bond. When this is required, considerable danger exists of overheating the assembly and causing burning or injury to the braid or the hose.

It is an object of this invention to provide a method for soldering a fitting or connector to the end of standard flexible metal hose of the type hereinbefore described, wherein the danger of burning or weakening portions of the assembly is avoided, and the difficulty of inserting the end of the hose in the fitting is eliminated.

It is also an object to provide a method suitable for mass production, and an assembly wherein the hose can be adequately supported adjacent the soldered bond so as to reinforce the connection against failure of the bond upon flexure of the hose.

In accordance with my invention, a relatively thin-walled metal sleeve fitting snugly over the braided sheath of the flexible metal hose is placed thereon, and after cutting off the end of the hose to align the end of the sheath and the flexible tubing, the sleeve is advanced until its end is aligned with that of the hose and its sheath. The braided sheath is thereby constricted against the tubing and confined against spreading or being pushed back on the tubing.

The fitting to which the hose is to be connected has a cavity of a diameter adapted slidably to receive the sleeve with the hose therein. If the fitting has a rearwardly extending bore or passage communicating with the cavity, the latter is closed by insertion of a pin of solder-repellent material, such as aluminum, and a quantity of solder is deposited in the base of the cavity of the fitting. The end of the hose carrying the sleeve is then inserted into the cavity so as to displace the solder. The latter rises between the sleeve and the side wall of the cavity aided by capillary attraction, and also between the braided sheath and the sleeve, entering the interstices of the braid, and likewise bonds to the end of the flexible metal tubing immersed therein. After cooling to solidify the solder, the pin is withdrawn, leaving the hose firmly soldered to the fitting.

Since the operation of inserting the hose and sleeve in the fitting requires no difficult manipulation, and can be rapidly carried out, the parts need only be heated for a minimum period to the optimum temperature for forming a solder bond, so that all danger of burning the braid or otherwise injuring the hose from overheating is avoided. In view of the convenience and ease with which the assembly operation can be carried out, it is admirably adapted for mass production.

If desired, the sleeve can be constructed to extend a substantial distance beyond the end of the fitting, thereby reinforcing the hose against flexure adjacent the soldered bond, and preventing failure of the bond from axial flexure of the hose.

My invention will be more fully understood from the following description taken in connection with the accompanying drawing, wherein:

Figure 1 is a side elevation of the flexible metal hose assembled with the fitting;

Fig. 2 is a view partially in axial cross-section showing the parts of Fig. 1, preparatory to assembly thereof;

Fig. 3 is a view similar to Fig. 2 showing the parts after their assembly; and

Fig. 4 is an exploded view of said parts prior to assembly thereof.

Referring to the drawings, the assembly shown therein comprises a flexible metal hose 10 having a sheath 11 of braided copper or other metal wire, and within said sheath, a length of corrugated metal tubing 12, having helical corrugations in the illustrated embodiment. However, flexible hose comprising tubing with concentric corrugations can be similarly used. A thin cylindrical sleeve 13 of solderable metal, such as brass, copper or bronze is adapted to fit snugly around the hose 10, embracing the braided sheath 11 thereof.

The fitting 14 in the form illustrated, comprises a cup portion 15 having a cylindrical cavity 16 therein of a diameter adapted slidably to receive the sleeve 13, and the flexible hose 10 embraced thereby. A rear portion 17, which can be externally threaded to permit its assembly with other structures, includes a bore 18 communicating with the cavity 16 and of a diameter approximating the inside diameter of the flexible tubing 12.

In order to secure the fitting 14 to the end of flexible metal hose 10, the sleeve 13 is placed over the end of the hose and slid rearwardly thereon as illustrated in Fig. 4. The braided sheath 11 and the tubing 12 are cut off so that their ends will normally be aligned. When cut, the end of the sheath may flare outward as indicated at 19 in Fig. 4. The sleeve 13 is then advanced on the hose 10 until its end is flush with the cut end of the hose, as shown in Fig. 2, thereby confining the flared portion 19 of the sheath against the hose, in its original condition.

An aluminum pin 20, having a shaft 21 conforming in diameter to the bore 18 of the fitting 14, is inserted in said bore from the rear end of the fitting, so that it extends into the cavity 16. The shaft 21 preferably extends beyond the cup portion 15 of the fitting.

A quantity of solder 22 is placed in the cup of the fitting, and is heated if necessary, for example by induction heating or by direct application of a flame to melt the solder and maintain it in molten condition. The pin 20 prevents the solder from running out of the cavity 16 through bore 18. It is also advantageous in some cases to preheat the end of the flexible hose and sleeve 13 surrounding the same, to prevent too rapid cooling of the solder in the ensuing assembly operation.

The hose 10 and sleeve 13 are inserted downwardly into the cup portion 15 of the fitting so as to immerse the hose and sleeve in the solder and displace the same upwardly, the shaft 21 of pin 20 entering the end of the hose. The solder 22 rises upon such displacement, aided by capillary attraction, between the sleeve 13 and the adjacent inside wall of the cavity 16, and also rises between the sleeve 13 and the sheath 11 entering the interstices of the braid. At the base of the cavity 16 the solder bonds to the end of the flexible tubing 12, which is immersed therein. When the assembly has cooled sufficiently to solidify the solder, the pin 20 is removed.

It will be observed that the braided sheath 11, the sleeve 13 and tubing 12 are all firmly bonded together and to the fitting 14 by the solder, without the necessity of risking excessive heating and consequent injury to the metal of the sheath 11 or tubing 12. In addition, the sleeve 13 extending substantially beyond the cup portion 15 to the fitting, provides desirable support, reinforcing the soldered bond against undue strain from flexure of the hose.

In making up connections according to previously known methods, omitting the sleeve 13 of my invention, the difficulty encountered in inserting the end of the hose into the cup portion of the fitting by reason of expansion of the braid required individual manipulation for each connection, which rendered the operation impractical for mass production.

The operations involved in assembling the hose and the fitting in accordance with my invention can be readily carried out on a series of lengths of hose with great facility in a continuous manner, since assembly of the sleeve with the hose, as well as insertion of the hose and sleeve in the fitting presents no difficulty and is adapted to be carried out on a moving belt or dial in rapid succession.

Other forms of fittings than the ones illustrated in the drawings can be employed, having a cup portion or similar structure for receiving the solder, and enclosing the end of the hose and the sleeve.

Variations and modifications may be made within the scope of this invention and portions of the improvements may be used without others.

I claim:

1. In combination with flexible metal hose having a sheath of wire braid, a fitting having a cylindrical cavity enclosing the end of the hose, a thin cylindrical metal sleeve embracing the hose and its sheath at the end thereof and slidably fitting into said cylindrical cavity, and a mass of solder bonding the tubing of said hose to the base of said cavity, forming a bond between said sleeve and braided sheath as well as between said fitting and said sleeve, and entering the interstices of the braided sheath.

2. The method of securing the end of a composite metal article including an inner member and an outer expansible sheath of wire braid closely embracing the inner member to a body having a cylindrical cup-shaped article-receiving cavity which comprises positioning on the end of the article a thin metal sleeve adapted to fit slidably within said cup-shaped cavity and snugly embrace the inner member and its braided sheath to prevent expansion of said sheath, providing a mass of molten solder in the base of the cavity, inserting the assembled sleeve and composite article into the cavity so as to immerse the end of the article in the solder, and displacing a portion of the solder to cause it to rise between said sleeve and said sheath and between said sleeve and said body.

STEPHEN GUARNASCHELLI.

REFERENCES CITED

The following references are of record in the file of this patent:

UNITED STATES PATENTS

| Number | Name | Date |
| --- | --- | --- |
| 1,063,816 | McLaughlin | June 3, 1913 |
| 1,481,341 | Bersted | Jan. 22, 1924 |
| 2,028,600 | Guarnaschelli | Jan. 21, 1936 |
| 2,129,125 | Geyer | Sept. 6, 1938 |
| 2,337,603 | Hertzberg | Dec. 28, 1943 |